US011003409B1

(12) United States Patent
Fell, Jr. et al.

(10) Patent No.: US 11,003,409 B1
(45) Date of Patent: May 11, 2021

(54) ADVANCED MULTI-TOUCH CAPABILITIES

(71) Applicant: LOCKHEED MARTIN CORPORATION, Bethesda, MD (US)

(72) Inventors: William C. Fell, Jr., Stuart, FL (US); Jason E. Browning, Ithaca, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 16/815,413

(22) Filed: Mar. 11, 2020

(51) Int. Cl.
| | |
|---|---|
| *G06F 3/045* | (2006.01) |
| *G06F 3/14* | (2006.01) |
| *G06F 3/044* | (2006.01) |
| *G09G 5/14* | (2006.01) |
| *G06F 21/60* | (2013.01) |
| *G06F 16/29* | (2019.01) |
| *B64D 43/00* | (2006.01) |
| *G06F 21/64* | (2013.01) |

(52) U.S. Cl.
CPC ........... *G06F 3/1438* (2013.01); *B64D 43/00* (2013.01); *G06F 3/044* (2013.01); *G06F 16/29* (2019.01); *G06F 21/604* (2013.01); *G06F 21/64* (2013.01); *G09G 5/14* (2013.01); *G06F 3/045* (2013.01); *G09G 2358/00* (2013.01); *G09G 2370/00* (2013.01); *G09G 2380/12* (2013.01)

(58) Field of Classification Search
USPC .................... 345/170–178, 590, 690–699
See application file for complete search history.

(56) References Cited

U.S. PATENT DOCUMENTS

| | | | | |
|---|---|---|---|---|
| 8,633,913 | B1 * | 1/2014 | Raghu | ................... G06F 3/0416 |
| | | | | 345/173 |
| 9,007,327 | B1 * | 4/2015 | Raghu | ....................... G06F 3/01 |
| | | | | 345/173 |
| 10,162,514 | B2 | 12/2018 | Shapiro et al. | |
| 10,175,921 | B2 | 1/2019 | Jayaraj | |
| 2014/0070965 | A1 | 3/2014 | Letsu-Dake | |
| 2017/0315706 | A1 * | 11/2017 | Helppi | .................. G06F 3/0481 |

* cited by examiner

*Primary Examiner* — Tony O Davis
(74) *Attorney, Agent, or Firm* — Michael Best & Friedrich LLP

(57) ABSTRACT

According to an aspect, a collaborative aircraft display system includes an aircraft, a first display unit in a first position of the aircraft and in operable communication with a buffer unit, a second aircraft display in a second position and in operable communication with the buffer unit, where the first display unit operable to transmit a distinct copy of first data to the second display unit via a haptic stimulus, and where the buffer unit operable to filter a second data from being transmitted to the second display unit.

20 Claims, 3 Drawing Sheets

ADVANCED MULTI-TOUCH CAPABILITIES

STATEMENT OF FEDERAL SUPPORT

This invention was made with government support under W911W6-19-9-0005 awarded by the Army. The government has certain rights in the invention.

BACKGROUND

Exemplary embodiments relate to helicopters or other aircraft, and more particularly, to a visual display having advanced multi-touch capabilities.

Aircraft cockpits have multiple visual displays. Crew members and passengers of an aircraft are equipped with avionics such as multi-function displays (MFDs) and primary flight displays (PFDs).

BRIEF DESCRIPTION

According to one embodiment, a collaborative aircraft display system includes an aircraft, a first display unit in a first position of the aircraft and in operable communication with a buffer unit, a second aircraft display in a second position and in operable communication with the buffer unit, where the first display unit operable to transmit a distinct copy of first data to the second display unit via a haptic stimulus, and where the buffer unit operable to filter a second data from being transmitted to the second display unit.

In addition to one or more of the features described above or below, or as an alternative, the first data comprises the second data, and wherein the second data is confidential data.

In addition to one or more of the features described above or below, or as an alternative, a view of the first display unit from the second position is obstructed.

In addition to one or more of the features described above or below, or as an alternative, the collaborative aircraft display system further includes a first display state controller in operable communication with the first display unit and the buffer unit, and a second display state controller in operable communication with the second display unit and the buffer unit.

In addition to one or more of the features described above or below, or as an alternative, the first display state controller is operable to continuously monitor an image projected on the first display unit and generate a set of state vectors describing the image, and the second display state controller is operable to receive a set of state vectors and cause the second display unit to display an image based at least in part on the received set of state vectors.

In addition to one or more of the features described above or below, or as an alternative, the collaborative aircraft display system further includes a navigation system in operable communication with the first display state controller and the second display state controller.

In addition to one or more of the features described above or below, or as an alternative, the second display state controller is further operable to update the received set of state vectors based at least in part on data received from the navigation system.

In addition to one or more of the features described above or below, or as an alternative, the filtering comprises masking or redacting the second data.

In addition to one or more of the features described above or below, or as an alternative, the first display unit and the second display unit comprise a respective touchscreen display.

In addition to one or more of the features described above or below, or as an alternative, masking comprises replacing authentic second data with inauthentic data.

In addition to one or more of the features described above or below, or as an alternative, redacting data comprises removing the second data.

In addition to one or more of the features described above or below, or as an alternative, the decision to mask or redact the second data is based at least in part on the nature of the second data and the first data being transmitted.

In addition to one or more of the features described above or below, or as an alternative, the first display unit is a multi-function display (MFD) or a primary flight display (PFD).

In addition to one or more of the features described above or below, or as an alternative, the second display unit is a multi-function display (MFD) or a primary flight display (PFD).

In addition to one or more of the features described above or below, or as an alternative, the first data is a pane of an image displayed on the first display unit.

The collaborative aircraft display system of claim 1, the first data is an entire image displayed on the first display unit.

In addition to one or more of the features described above or below, or as an alternative, the first data is a moving map.

In addition to one or more of the features described above or below, or as an alternative, filtering the first data is based at least in part on a security clearance of a user of the second display unit.

In addition to one or more of the features described above or below, or as an alternative, the buffer device is further operable to receive metadata from the first display unit.

In addition to one or more of the features described above or below, or as an alternative, the aircraft is a rotary-wing aircraft or a fixed winged aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatuses is presented herein by way of exemplification and not limitation with reference to the Figures.

Fixed wing and rotary wing aircraft rely on multiple crew members to operate the different aviation-based systems in the aircraft. Each crew member has a respective terminal, for operating their own flight program in parallel with other crew members. Crew members use their terminals to communicate with other passengers, individuals on the ground, or individuals on other aircraft, and vice versa. Periodically, one person may need to transmit data on their display to another display. However, many aircraft do not include a central data store that holds all of the data being displayed on each crew member's terminal. Furthermore, due to a cockpit layout or location of a display, it may not be practical or possible to look off the person's display. Additionally, each person may have specific data on their display that either needs to be continuously displayed or is not relevant to anyone else. Therefore, the aircraft need a display system that permits the transfer of data from one display to another, without a central data storage, and that also removes unnecessary data during transmission.

Figure 1:
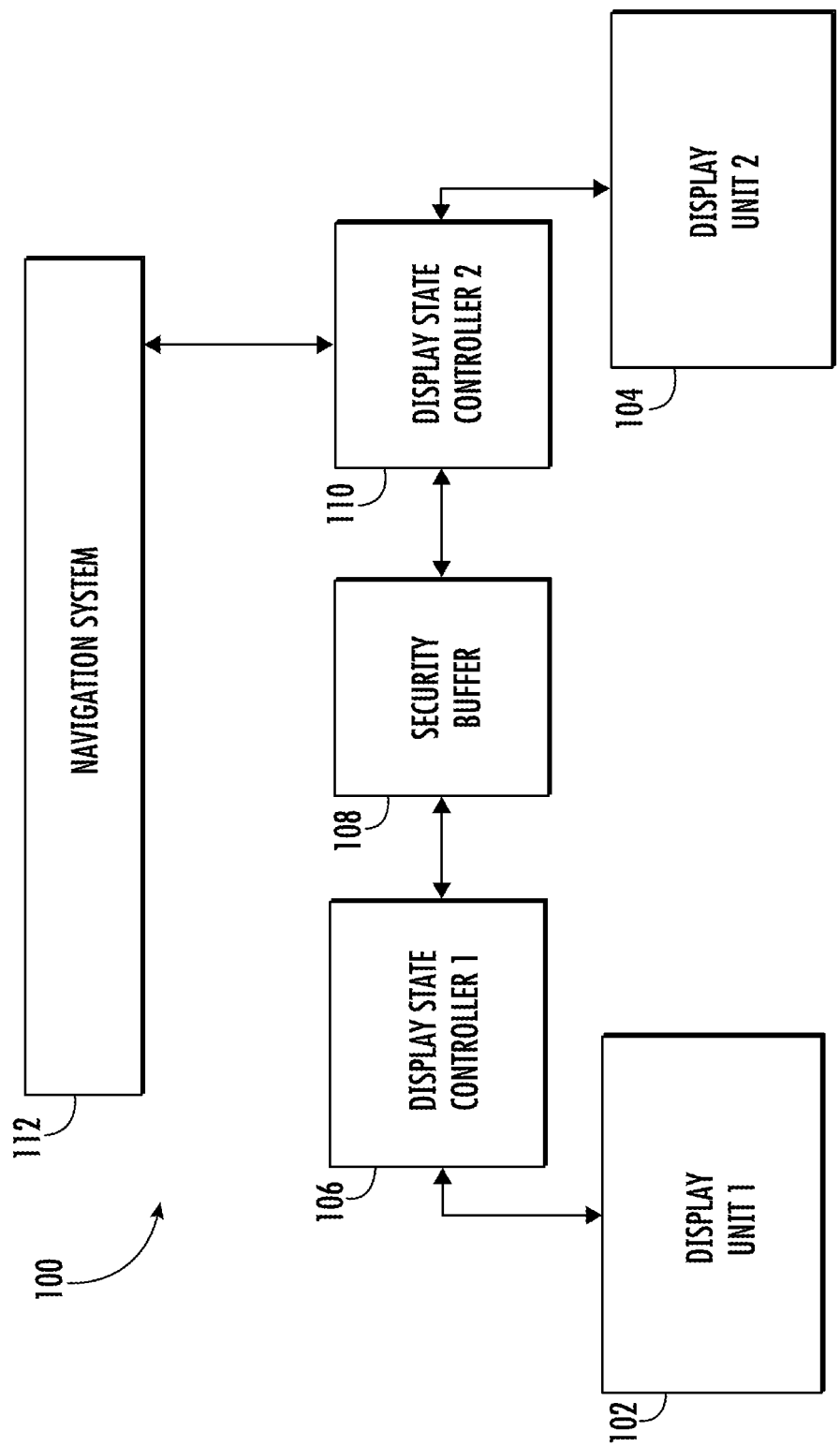
FIG. 1 depicts a collaborative multi-display system, in accordance with an exemplary embodiment.
Figure 3:
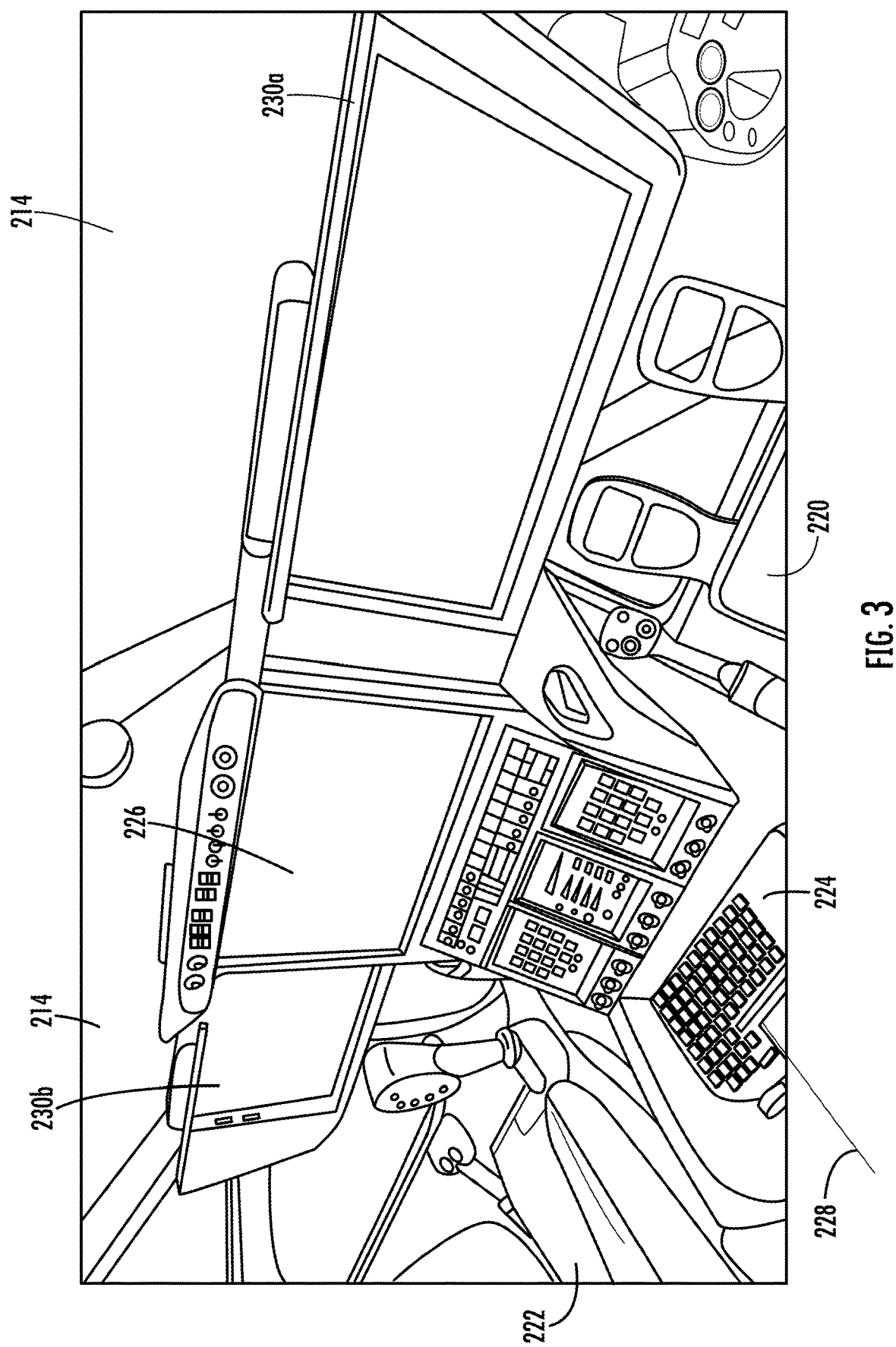
FIG. 3 depicts a perspective view of a cockpit, in accordance with an exemplary embodiment.

Referring to FIG. 1, a collaborate multi-display system 100 for an aircraft is shown. The system includes a first display unit 102 in operable communication with a second display unit 104. The first display unit 102 and the second display unit 104 include any combination of MFD 26 and the PFDs 230a 230b. It should be appreciated that although FIG. 3 illustrates two display units, the system functions with a greater number of display units in an aircraft. The first display is in communication with the second display via a first display state controller 106, a security buffer, 108, and a second display state controller 110. The first display state controller 106 and the second display state controller 110 may be in operable communication with a navigation system 112. In some iterations, the second display state controller 110 and the second display unit 104 are arranged within the aircraft. The second display state controller 110 and the second display unit 104 may both be arranged in the cockpit of the aircraft, or they may be arranged in a different portion of the aircraft, for example, in a cargo bay. In other iterations, the second display state controller 110 and the second display unit 104 are located away from the aircraft, for example, as part of a computing device deployed on the ground, or in another aircraft or vehicle.

The first and second display units 102, 104 include a flat-screen, a multi-function display (MFD), a CRT-type MFD, heads-up display (HUD), helmet-mounted heads-up display, mobile computing unit with a display, or any other display device capable of displaying a graphical representation. The first and second display units 102, 104 can also be an LCD multi-function display (MFD) having a split-screen capability for simultaneously displaying two or more panes at a time, for example, one pane displays sensor readings, a second pane displays a map, while a third pane displays other relevant data including real-time positioning, direction, altitude, and speed. A pane is a section of the respective image being displayed on the first and second display units 102, 104 and provides a crew member with data or quick access to additional data.

A processing unit (not shown) controls the different operations of the data being transferred into or out of the first and second display units 102, 104. Each display unit 102, 104 includes a processor that communicates with the respective display state controllers 106, 110, via address lines, data lines, and/or control lines. Each processor is further connected to a memory unit (not shown), for example, Dynamic Random-Access Memory (D-RAM), Static RAM (S-RAM), or other RAM or a flash memory. The processors can also be in communication with a storage device (not shown), for example, a hard disk, a magneto-optical medium, an optical medium, or other type of device for electronic data storage.

The first and second display units 102, 104 include touchscreen capability that permits a user to control the display and transfer of data via haptic stimuli. The first and second display units 102, 104 include a resistor-based touchscreen or a capacitor-based touchscreen. Although a user primarily actuates the first and second display units 102, 104 by hand, a stylus, cursor, or mouse-based pointing device can also be used.

Each user can use the touchscreen capability to control the images displayed on his or her display unit. For example, a user can choose to display a moving map in one frame and display electronic communications in another frame. The first and second display units 102, 104 also permit a user to drag a frame to another portion of a screen or change the size of a particular frame. In addition, a visual keyboard, for example, a QWERTY-style keyboard, can be displayed to permit each crew member to type on the touchscreen manually.

Each first display unit 102 is operable to transmit data to each second display unit 104, and vice-versa. Once the data is transmitted, both the first display unit 102 and the second display unit 104 display independent versions of the data. For example, if a first user operating the first display unit 102 transmits a moving map to the second display unit 104 operated by a second user, each user has an independent moving map. Therefore, if the second user manipulates their moving map in any fashion, the manipulation does not affect the moving map on the first display unit 102.

Each first display unit 102 is operable to allow a user to choose which user to transmit data, and which data to transmit based on a haptic stimulation. For example, the first display unit 102 can include a drop-down menu that includes each other user's identity. The user can touch the screen to enable the drop-down menu and touch the portion of the display that includes the other user's identity. The first display unit 102 can also direct data to a particular user based on a directional touching. For example, swiping diagonally to an upper right corner may cause the data to be directed to one user's display unit 104, whereas swiping down may cause the first display unit 102 to transmit data to another user's display unit 104.

Each first display unit 102 and second display unit 104 is operable to permit the user to choose which data is being transmitted with the touchscreen capability. For example, a user may press on a particular pane for a period of time, and then swipe in a direction to transmit the data displayed in the pane to the second display unit 104. Additionally, it is operable to permit an entire frame to be transmitted. For example, by pressing down on the first display unit 102 for a period of time greater than a threshold amount, the user can direct the entire frame to be transmitted.

As seen in FIG. 1, the data travels from the first display unit 102 to the first display state controller 106 to the security buffer 108 to the second display state controller 110 to the second display unit 104. The first display state controller 106 and the second display state controller 110 are processing devices that interface with the first display unit 102 and the second display unit 104, respectively. Each of the first and second display state controllers 106, 110 is operable to continuously monitor a state of their respective first and second display unit 102, 104. A state includes the current configuration of data being displayed and/or a configuration of the different panes of data being displayed. The first and second display state controllers 106 110 may also track a speed at which a visual marker is moving, or metadata such as a timestamp or an identity of the map.

The image displayed on each of the first and second display units 102 104 are reduced to respective sets of state vectors. The sets of state vectors are continuously updated in real-time based on the current image of the displays and stored in each respective first and second display state controller 106, 110. As a user engages the touchscreen of the first display unit 102, the first display state controller 106 stores the current set of state vectors upon an indication of which other user to transmit the data to and the identity of the data to be transmitted.

The first display state controller 106 transmits the current state of state vectors to the security buffer 108. The security buffer 108 is a device that monitors intra-aircraft communication between one user's terminal to another user terminal. Additionally, the security buffer 108 has access to both first and second display state controllers 106 110, and consequently to each current set of state vectors. The security buffer 108 can regulate the transmission of data from the first display unit 102 to ensure that the transmitted data is compatible with the image on the second display unit 104. The security buffer 108 can also monitor secured data displayed on the first display unit 102 from being inadvertently being transmitted to the second display unit 104.

As described above, a function of the security buffer 108 is to ensure that the transferred data is compatible with the second display unit 104. The security buffer 108 is equipped with rules specifying what data should remain on a user display. In one instance, data from a first display unit 102 may require half of the display of the second display unit 104, and the second display unit 104 does not have the requisite screen space. This may be due to the second display unit 104 displaying vital data that cannot be removed from the screen. In this event, the security buffer 108 can alert the second display state controller 110 to the load transmitted data onto a back page and generate a visual tab on the display of the second display unit 104 to permit the user to touch the tab to access the back page with the transmitted data.

Another function of the security buffer 108 is to control the transmission of sensitive data from one display to another. From time to time one user may have visual data on their display that is confidential or otherwise restricted to one or more other users. The confidential data may encompass an entire pane or may be portions of data being displayed on a pane. For example, a moving map may contain locations of classified locations, or a visual display includes block diagrams of the electrical, fuel, and engine systems with confidential components. It is still desirable to transmit the map or block diagram while hiding the confidential portions. The confidentiality designation of data can be transmitted to the security buffer 108 by the first display state controller 106. For example, the display state controller 106 can include an extra bit, such as a 1 bit, in a state vector to designate certain data as confidential data.

The security buffer 108 is equipped with a security clearance of each user. If a user has clearance to view the information, the security buffer 108 transmits the set of state vectors to the second display state controller 110, which in turn causes the data to be displayed on the second display unit 104. If, however, the user does not have clearance, the security buffer 108 either masks or redacts the confidential data prior to transmitting the set of state vectors to the second display state controller 110. Masking involves of replacing authentic data with inauthentic data that has the same structure. Redaction is blacking out or removing data. In this sense, the second display state controller 110 does not receive the confidential data. Whether the security buffer 108 masks or redacts data, is based on the nature of the confidential data and the overall data. If, for example, a visual icon of classified location is displayed on a moving map, the security buffer 108 can remove the visual icon. If, however, the confidential identities of multiple individuals are transmitted and simply removing the individuals' names would lead to confusion, the security buffer 108 can mask the names with, for example, changing the names to "person one" and "person two". The security buffer 108 is equipped with pre-loaded rules to determine whether to mask or redact information. Once the security buffer 108 has finalized the set of state vectors, it transmits the set to the second display state controller 110.

The second display state controller 110 receives the finalized set of state vectors and causes the image on the second display unit 104 to project an image based on the finalized set of state vectors. The user operating the second display unit 104 can view the data without viewing any confidential data.

In some instance, the user of the second display unit 104 may require than their display not be altered. In this instance, the security buffer 108 includes a locking mechanism. If the user of the second display unit 104 indicates that the display cannot be altered, the second display state controller 110 transmits a signal to the security buffer 108 that the second display unit 104 cannot be altered by a transmission from the first display unit 102. In this instance, if state vectors from the first display unit 102 is transmitted, the security buffer 108 stores the state vectors until such time that the second display state controller 110 indicates that the second display unit 104 can receive the transmission from the first display unit 102.

Upon receipt of the state vectors by the second display state controller 110, the second display state controller 110 detects a time stamp for when the state vectors were originally transmitted. The second display state controller 110 then determines if any data have been modified since the original transmission, for example, a position of the aircraft, a velocity, and sensor readings. The second display state controller 110 then transmits requests updated state vector values from the first display state controller 106 and/or the navigation unit 112. The second display state controller 110 then uses the updated state vectors to control the display on the second display unit 104

The first and second display state controllers 106 110 are also in operable communication with the navigation system 112 of the aircraft. Data from the navigation system 112 permits the second display state controller 110 to update any data transmitted by the security buffer 108. For example, in the time that the first display state controller 106 transmitted data to the security buffer 108, and the security buffer 108 transmitted data to the second display state controller 110, a change in circumstance may have occurred. For example, an altitude, a velocity, and or time may have changed. In this instance, the second display state controller 110 can update the set of state vectors and cause the correct altitude, velocity, time, or other updated data to be displayed.

Figure 2:
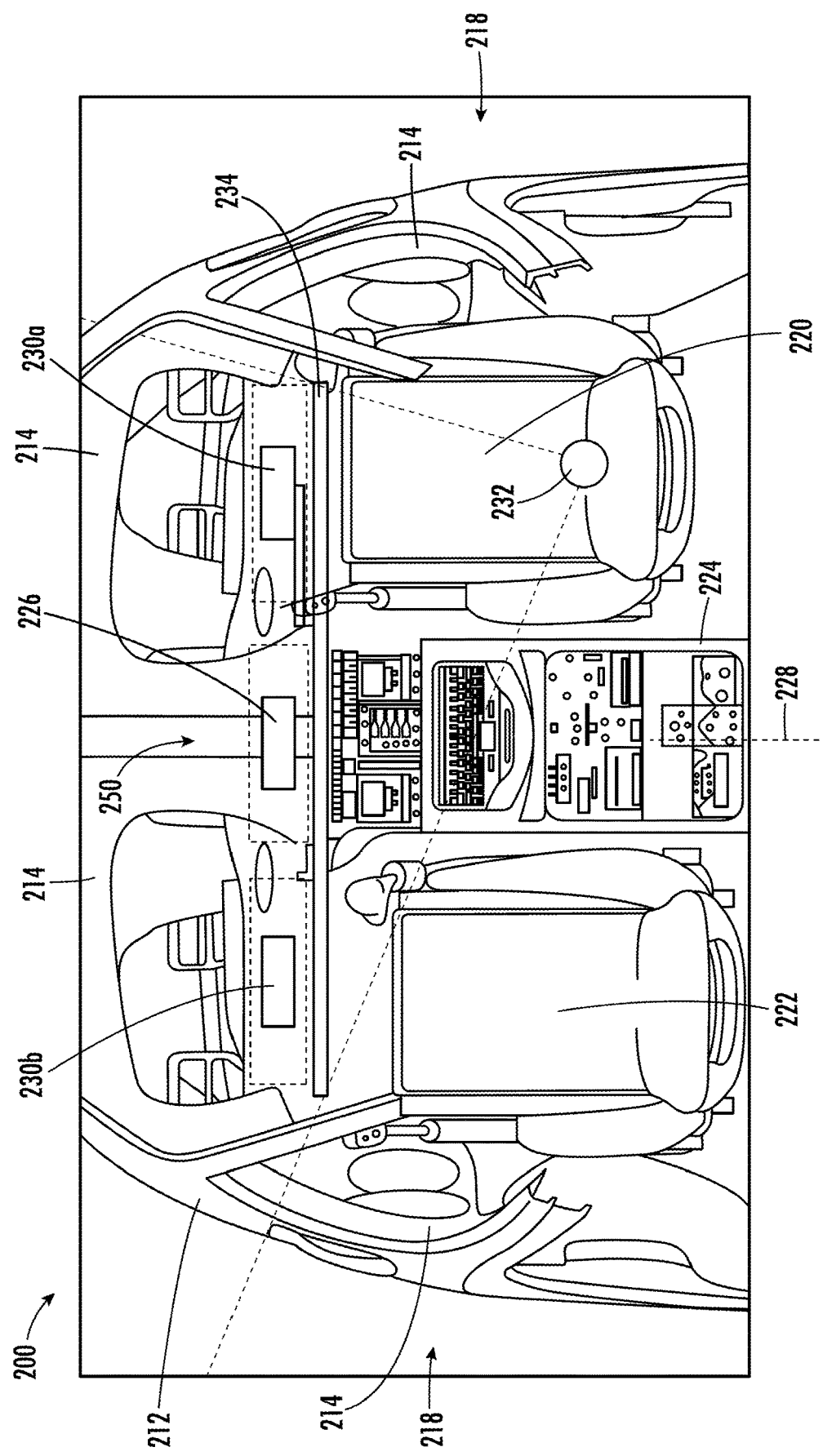
FIG. 2 depicts a perspective view of a cockpit, in accordance with an exemplary embodiment.

Shown in FIG. 2 is an example overhead view of a cockpit 200 of aircraft, for example, a helicopter. The cockpit 200 includes windows 214 located at a front 216 and sides 218 of the cockpit 200. Two crew member positions, in this embodiment, a pilot position 220 and a copilot position 222 are located in the cockpit 200, positioned in a side by side configuration. It should be appreciated that although the herein described figures are with respect to a side by side configuration, one of ordinary skill in the art would appreciate that the herein described embodiments may be applied to other cockpit configurations, such as single seat configurations. It should be further appreciated that the herein described embodiments may be applied to a fixed wing aircraft.

A cockpit display system 250 is located in the cockpit 200 and includes an instrument console 224 that is located between the pilot position 220 and the copilot position 222, and in some embodiments extends upwardly to include a multi-functional display (MFD) 226, or other panel located to be viewable from both the pilot position 220 and the copilot position 222. As shown, the MFD 226 is located along a cockpit central axis 228 extending between the pilot position 220 and the copilot position 222. In some embodiments, the MFD 226 is supported by the instrument console 224, while in other embodiments, the MFD 226 may be a separate component independently mounted in the cockpit 200.

A primary flight display (PFD) 230 extends laterally from the console 224 at each of the pilot position 220 and the copilot position 222, with PFD 230a at the pilot position 220 and PFD 230b at the copilot position 222, in FIG. 2, the RFD's 230a and 230b are located in a first position 234, relative to the pilot position 220 and copilot position 222 and a design eye point 232 representing a location of a pilot when at the pilot position 220. The first position 234 is directly in front of the pilot position 220, laterally centered on the design eye point 232. When under some operating conditions, however, the first positions 234 of the PFD's 230a and 230b present an obstruction to crew external view through the windows 214. The degree of obstruction is shown in FIG. 2, and also in FIG. 3 where, in particular, the obstruction of view of the pilot at the pilot position 220 by the PFD 230 located at the copilot position 222 cross-cockpit from the pilot position 220.

The terms "about," "substantially," "approximately," and variations thereof, are intended to include the degree of error associated with measurement of the particular quantity based upon the equipment available at the time of filing the application. For example, "about" can include a range of ±10%, or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A collaborative aircraft display system comprising:
   an aircraft;
   a first display unit in a first position of the aircraft and in operable communication with a buffer unit;
   a second display unit in a second position of the aircraft and in operable communication with the buffer unit, the first display unit operable to transmit a distinct copy of first data to the second display unit via a haptic stimulus, and the buffer unit operable to filter a second data from being transmitted to the second display unit;
   wherein filtering the first data is based at least in part on a security clearance of a user of the second display unit.

2. The collaborative aircraft display system of claim 1, wherein the first data comprises the second data, and wherein the second data is confidential data.

3. The collaborative aircraft display system of claim 1, wherein a view of the first display unit from the second position is obstructed.

4. The collaborative aircraft display system of claim 1, further comprising:
   a first display state controller in operable communication with the first display unit and the buffer unit; and
   a second display state controller in operable communication with the second display unit and the buffer unit.

5. The collaborative aircraft display system of claim 4, wherein the first display state controller is operable to continuously monitor an image projected on the first display unit and generate a set of state vectors describing the image, and wherein the second display state controller is operable to receive a set of state vectors and cause the second display unit to display an image based at least in part on the received set of state vectors.

6. The collaborative aircraft display system of claim 4, further comprising:
   a navigation system in operable communication with the first display state controller and the second display state controller.

7. The collaborative aircraft display system of claim 6, wherein the second display state controller is further operable to update a received set of state vectors based at least in part on data received from the navigation system.

8. The collaborative aircraft display system of claim 1, wherein the filtering comprises masking or redacting the second data.

9. The collaborative aircraft display system of claim 1, wherein the first display unit and the second display unit comprise a respective touchscreen display.

10. The collaborative aircraft display system of claim 1, wherein the first display unit is a multi-function display (MFD) or a primary flight display (PFD).

11. The collaborative aircraft display system of claim 1, wherein the second display unit is a multi-function display (MFD) or a primary flight display (PFD).

12. The collaborative aircraft display system of claim 1, wherein the first data is a pane of an image displayed on the first display unit.

13. The collaborative aircraft display system of claim 1, wherein the first data is an entire image displayed on the first display unit.

14. The collaborative aircraft display system of claim 1, wherein the first data is a moving map.

15. The collaborative aircraft display system of claim 1, wherein the buffer device is further operable to receive metadata from the first display unit.

16. The collaborative aircraft display system of claim 1, wherein the aircraft is a rotary-wing aircraft or a fixed winged aircraft.

17. A collaborative aircraft display system comprising:
   an aircraft;
   a first display unit in a first position of the aircraft and in operable communication with a buffer unit;
   a second display unit in a second position of the aircraft and in operable communication with the buffer unit, the first display unit operable to transmit a distinct copy of first data to the second display unit via a haptic stimulus, and the buffer unit operable to filter a second data from being transmitted to the second display unit;

wherein the filtering comprises masking or redacting the second data.

18. The collaborative aircraft display system of claim 17, wherein masking comprises replacing authentic second data with inauthentic data.

19. The collaborative aircraft display system of claim 17, wherein redacting data comprises removing the second data.

20. The collaborative aircraft display system of claim 17, wherein the decision to mask or redact the second data is based at least in part on the nature of the second data and the first data being transmitted.

\* \* \* \* \*